United States Patent
Dong (10) Patent No.: US 12,302,165 B2
(45) Date of Patent: May 13, 2025

(54) METHOD FOR TRANSMITTING DATA, COMMUNICATION DEVICE, AND STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 220 days.

(21) Appl. No.: 17/909,719

(22) PCT Filed: Mar. 10, 2020

(86) PCT No.: PCT/CN2020/078613
§ 371 (c)(1),
(2) Date: Sep. 6, 2022

(87) PCT Pub. No.: WO2021/179166
PCT Pub. Date: Sep. 16, 2021

(65) Prior Publication Data
US 2024/0022951 A1 Jan. 18, 2024

(51) Int. Cl.
*H04W 28/02* (2009.01)
*H04W 74/08* (2009.01)

(52) U.S. Cl.
CPC ....... *H04W 28/0263* (2013.01); *H04W 74/08* (2013.01)

(58) Field of Classification Search
CPC .......................... H04W 28/0263; H04W 74/08
See application file for complete search history.

(56) References Cited

U.S. PATENT DOCUMENTS

| | | | |
|---|---|---|---|
| 9,019,874 B2 | 4/2015 | Choudhury et al. | |
| 2009/0285165 A1* | 11/2009 | Berglund | H04W 72/541 370/329 |
| 2012/0127865 A1* | 5/2012 | Nakae | H04W 72/541 370/337 |
| 2013/0294261 A1* | 11/2013 | Ghosh | H04W 28/14 370/252 |
| 2013/0294360 A1* | 11/2013 | Yang | H04W 24/02 370/328 |

(Continued)

FOREIGN PATENT DOCUMENTS

| | | |
|---|---|---|
| CN | 104412690 A | 3/2015 |
| CN | 106465271 A | 5/2015 |

(Continued)

OTHER PUBLICATIONS

International Search Report of PCT/CN2020/078613, dated Nov. 6, 2020 with English translation, (4p).

(Continued)

*Primary Examiner* — Fahmida S Chowdhury
(74) *Attorney, Agent, or Firm* — Arch & Lake LLP (57) ABSTRACT

A method for transmitting data, performed by a first communication device, includes: selecting one transmission link from a plurality of transmission links to transmit a beacon frame carrying downlink link indication information, where the downlink link indication information is configured to indicate a transmission link having cached downlink data in the plurality of transmission links; and transmitting the beacon frame through the selected transmission link.

18 Claims, 5 Drawing Sheets

(56) References Cited

U.S. PATENT DOCUMENTS

| | | | | |
|---|---|---|---|---|
| 2014/0003414 A1* | 1/2014 | Choudhury | .......... | H04W 74/006 |
| | | | | 370/347 |
| 2014/0029600 A1* | 1/2014 | Kim | ...................... | H04W 24/10 |
| | | | | 370/338 |
| 2014/0056232 A1* | 2/2014 | Park | .................. | H04W 28/0263 |
| | | | | 370/329 |
| 2014/0071900 A1* | 3/2014 | Park | .................. | H04W 52/0229 |
| | | | | 370/329 |
| 2014/0153469 A1* | 6/2014 | Park | .................. | H04W 52/0203 |
| | | | | 370/311 |
| 2014/0301322 A1* | 10/2014 | Yang | ........................ | H04L 69/04 |
| | | | | 370/329 |
| 2015/0382231 A1* | 12/2015 | Jabbar | ............... | H04W 28/0268 |
| | | | | 370/230 |
| 2016/0183189 A1* | 6/2016 | Merlin | ............... | H04W 52/0235 |
| | | | | 370/311 |
| 2018/0049240 A1* | 2/2018 | Kim | ...................... | H04W 74/08 |
| 2018/0213481 A1* | 7/2018 | Merlin | .............. | H04W 52/0235 |
| 2018/0242355 A1* | 8/2018 | Lou | ........................ | H04W 74/08 |
| 2019/0053325 A1* | 2/2019 | Yu | .......................... | H04W 76/15 |
| 2019/0335370 A1* | 10/2019 | Kumar | .................. | H04W 36/38 |

FOREIGN PATENT DOCUMENTS

| | | |
|---|---|---|
| CN | 110830175 A | 2/2020 |
| WO | 2013049136 A1 | 4/2013 |

OTHER PUBLICATIONS

Xianjin, Jia et al., "Surviving screen-off battery through out-of-band Wi-Fi coordination", IEEE Infocom 2017, May 4, 2017, (9p).

Xianjin, Jia et al., "Enabling Out-of-Band Coordination of Wi-Fi Communications on Smartphones" IEEE/ACM Transactions on Networking, vol. 27, No. 2, Mar. 2019, (14p).

Extended European Search Report issued in Application No. 20924342.7, dated Feb. 24, 2023,(8p).

OA and English translation thereof for CN Application No. 202080000502.8, dated Jul. 20, 2023, with English translation, (12p).

* cited by examiner

METHOD FOR TRANSMITTING DATA, COMMUNICATION DEVICE, AND STORAGE MEDIUM

CROSS-REFERENCE TO RELATED APPLICATION

This application is the national phase of International Application No. PCT/CN2020/078613, filed on Mar. 10, 2020, the entire content of which is incorporated herein by reference for all purposes.

TECHNICAL FIELD

The disclosure relates to the field of wireless communication technologies but is not limited to the field of wireless communication technologies, and in particular, to a method for transmitting data, a communication device, and a storage medium.

BACKGROUND

The institute of electrical and electronics engineers (IEEE) established a study group (SG) to study a next-generation mainstream wireless fidelity (Wi-Fi) technology, namely IEEE802.11be standard. The studying scope is Wi-Fi transmission with a maximum bandwidth of 320 MHz, aggregation and coordination of multiple frequency bands, and the like. The proposed goal is to improve the speed and throughput of the existing 802.11ax by at least four times. The scenarios of the new technologies are video transmission, augmented reality (AR), virtual reality (VR) and the like.

The aggregation and coordination technology of multiple frequency bands refers to simultaneous communication among Wi-Fi devices in transmission links of different frequency bands such as 2.4 GHz, 5.8 GHz, and 6-7 GHz or in transmission links of different bandwidths under the same frequency band.

There are two manners for a station (STA) that enters a dormant state to obtain cached data.

Figure 1:
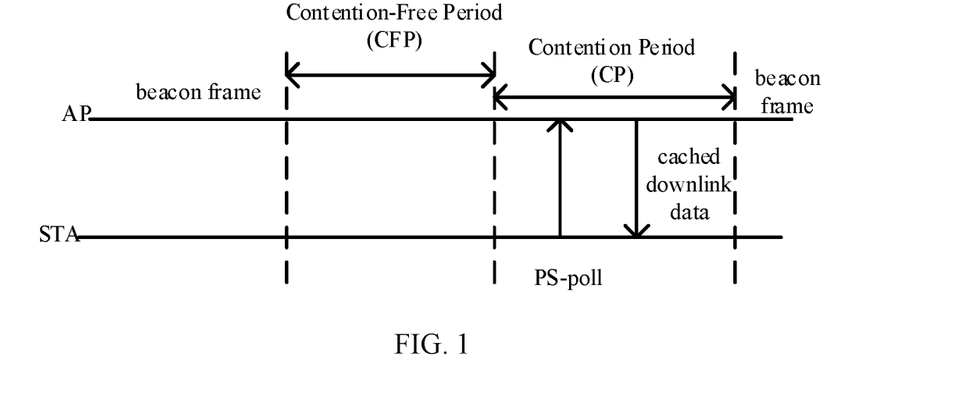
FIG. 1 is a schematic diagram of an interaction of obtaining cached downlink data during a contention period.

One, as illustrated in FIG. 1, the STA periodically wakes up and listens to a beacon frame, to determine whether an access point (AP) has cached downlink data. If there is a cached downlink data frame, the STA can transmit a power save poll (PS-poll) during a contention period (CP) to obtain resources to obtain downlink data.

Figure 2:
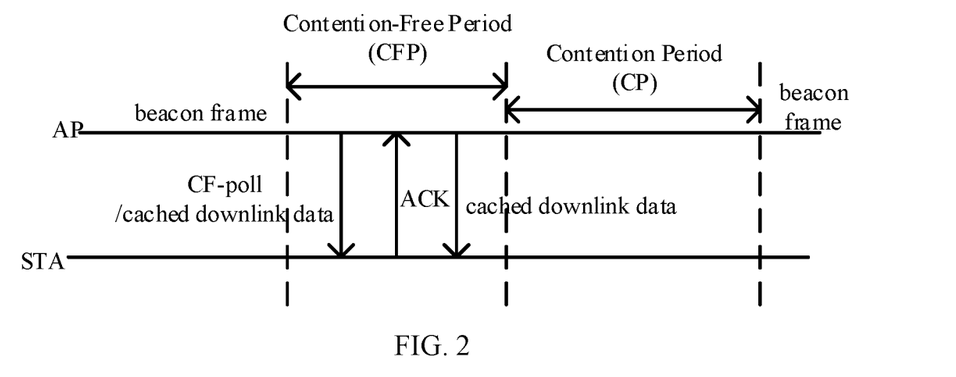
FIG. 2 is a schematic diagram of an interaction of obtaining cached downlink data during a contention-free period.

Two, as illustrated in FIG. 2, the STA negotiates a wake-up period with the AP, and the AP transmits a contention free-poll (CF-poll) during a contention-free period (CFP) to transmit the cached downlink data.

SUMMARY

According to a first aspect of the disclosure, a method for transmitting data is provided. The method is applied to a first communication device. The method includes: selecting one transmission link from a plurality of transmission links to transmit a beacon frame carrying downlink link indication information, in which the downlink link indication information is configured to indicate a transmission link having cached downlink data in the plurality of transmission links; and transmitting the beacon frame through the selected transmission link.

According to a second aspect of the disclosure, a method for transmitting data is provided. The method is applied to a second communication device. The method includes: receiving a beacon frame carrying downlink link indication information on a transmission link that is selected from a plurality of transmission links; and determining a transmission link having cached downlink data in the plurality of transmission links based on an indication of the downlink link indication information.

According to a third aspect of the disclosure, a communication device is provided. The communication device includes a processor, a transceiver, a memory, and an executable program stored on the memory and capable of being executed by the processor. The processor is configured to perform the method for transmitting data as described in the first aspect or the second aspect when executing the executable program.

According to a fourth aspect of the disclosure, a storage medium on which an executable program is stored, is provided. When the executable program is executed by a processor, the method for transmitting data as described in the first aspect or the second aspect is performed.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with embodiments of the disclosure. Instead, they are merely examples of apparatuses and methods consistent with aspects related to embodiments of the disclosure as recited in the appended claims.

Terms used in embodiments of the disclosure are merely for describing specific examples and are not intended to limit embodiments of the disclosure. The singular forms "one", "the", and "this" used in embodiments of the disclosure and the appended claims are also intended to include a multiple form, unless other meanings are clearly represented in the context. It should also be understood that the term "and/or" used in the disclosure refers to any or all of possible combinations including one or more associated listed items.

It should be understood that although terms "first", "second", "third", and the like are used in embodiments of the disclosure to describe various information, the information is not limited to the terms. These terms are merely used to differentiate information of a same type. For example, without departing from the scope of disclosure of the disclosure, first information is also referred to as second information, and similarly the second information is also referred to as the first information. Depending on the context, for example, the term "if" used herein may be explained as "when" or "while", or "in response to . . . , it is determined that".

Executive bodies involved in embodiments of the disclosure include, but are not limited to, communication devices in wireless communication networks, especially in Wi-Fi networks such as IEEE802.11a/b/g/n/ac standard and in next-generation Wi-Fi networks such as IEEE802.11be standard. The communication devices include, but are not limited to, wireless APs such as Wi-Fi routers, wireless STAs, user terminals, user nodes, mobile terminals, tablet computers, or the like.

An application scenario of embodiments of the disclosure is that, currently, there is no perfect solution for indicating on a plurality of transmission links whether each transmission link has cached downlink data.

Furthermore, after determining that the plurality of transmission links have cached downlink data, it is also necessary to listen to a beacon frame broadcast by the AP on each transmission link to obtain contention period (CP) information.

In this way, the STA needs to clarify which transmission link has cached downlink data and time information of a contention period on each transmission link, so that the STA needs to listen to on the plurality of transmission links, which is not conducive to the power saving of the STA. Furthermore, the AP needs to broadcast the beacon frame on each link. For example, the AP needs to establish an association with the conventional STA on each transmission link.

Figure 3:
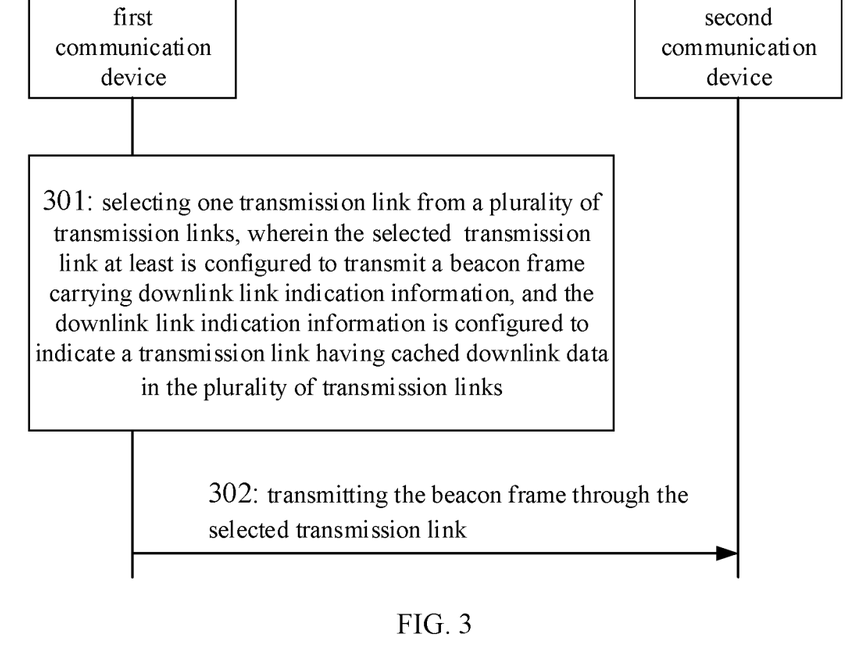
FIG. 3 is a flowchart of a method for transmitting data according to some embodiments.

As illustrated in FIG. 3, some embodiments provide a method for transmitting data. The method is applied to a first communication device of wireless communication. The method includes the following.

Step 301: one transmission link is selected from a plurality of transmission links to transmit a beacon frame carrying downlink link indication information, in which the downlink link indication information is configured to indicate a transmission link having cached downlink data in the plurality of transmission links.

Step 302: the beacon frame is transmitted through the selected transmission link.

The wireless communication may be the Wi-Fi communication such as IEEE802.11be standard. The first communication device may be a wireless AP in the Wi-Fi communication technology and the second communication device may be a wireless STA in the Wi-Fi communication technology. The first communication device and the second communication device may communicate through the plurality of transmission links.

In the plurality of transmission links, each transmission link can occupy one transmission frequency band and the plurality of transmission links can occupy the plurality of transmission frequency bands. The transmission frequency bands can be a plurality of Wi-Fi working frequency bands, such as 2.4 GHz, 5.8 GHz and 6-7 GHz. Under the same frequency band, the bandwidths occupied by the transmission frequency bands of the plurality of transmission links can be the same or different. For example, the bandwidths occupied by the plurality of transmission links may be one or more of 20 MHz, 40 MHz, and 80 MHz. The frequency range of the bandwidth occupied by each transmission frequency band can belong to the same Wi-Fi working frequency band or different Wi-Fi working frequency bands.

When the first communication device determines that one or more communication links have cached downlink data that needs to be transmitted to the second communication device, it can select one transmission link from the plurality of transmission links established with the second communication device, and transmit the beacon frame carrying the downlink link indication information through this transmission link. The downlink link indication information may simultaneously indicate one or more communication links that have cached downlink data. The downlink link indication information may indicate the transmission link having cached downlink data by carrying an identifier of the transmission link or the like.

After receiving the beacon frame carrying the downlink link indication information from the communication link selected by the first communication device, the second communication device determines the transmission link that has cached downlink data based on an indication of the downlink link indication information, and receives the downlink data cached by the first communication device on each transmission link that has cached downlink data.

The transmission link used to transmit the beacon frame carrying the downlink link indication information may be negotiated in advance by the first communication device and the second communication device, or specified by a communication protocol, or selected by the first communication device according to a predetermined selection rule. If the transmission link used to transmit the beacon frame carrying the downlink link indication information is selected by the first communication device, the first communication device may instruct the selected transmission link to the second communication device through an instruction or the like.

In some examples, after the first communication device establishes the plurality of communication links with the second communication device, one transmission link may be randomly selected to transmit the beacon frame carrying the downlink link indication information, and the second communication device may be instructed with the selected transmission link through the indication information.

In this way, one transmission link in the plurality of transmission links is used for transmitting the beacon frame indicating the transmission link having cached downlink data, and the downlink link indication information is concentrated into one transmission link for transmitting, which improves the efficiency of information indication; and it is not necessary for a wireless AP to respectively transmit indications of transmission links having cached downlink data on transmission links having cached downlink data, which saves transmission resources and further saves the energy consumption of the wireless AP. On the other hand, it is not necessary for a wireless STA to monitor the beacon frame indicating the transmission link having cached downlink data on each transmission link, which saves reception resources and further saves the energy consumption of the wireless STA.

In an embodiment, the downlink link indication information includes: TIM information and/or identification information, in which the TIM information is configured to indicate a second communication device to which the transmission link having the cached downlink data belongs, and the identification information is configured to indicate the transmission link having the cached downlink data.

The TIM can indicate the communication device having cached downlink data in the form of a bitmap or the like, and the identification information can indicate the transmission link having cached downlink data in the communication device indicated by the TIM.

When a wireless STA accesses a wireless AP, the wireless AP can assign an association identity (AID) to the wireless STA, and allocate one or more bits for each AID in the TIM to indicate the AID whether cached downlink data exits.

In some examples, a bit in the TIM may be used to indicate the wireless STA whether cached downlink data exits. For example, "1" may be used to indicate the wireless STA that cached downlink data exits, and "0" may be used to indicate the wireless STA that cached downlink data does not exit; or "1" may be used to indicate the wireless STA that cached downlink data does not exit, and "0" may be used to indicate the wireless STA that cached downlink data exits.

After the second communication device detects the beacon frame on the selected transmission link, it can parse the TIM in the beacon frame to determine whether cached downlink data exits, and if so, it continues to determine the transmission link having cached downlink data according to the identification information. The identification information may include the identification number of one or more transmission links.

In some embodiments, one identification information is set after one TIM, in which one identification information may include the identification number of at least one transmission link. It is also possible to carry the identification number of one transmission link in the identification information. When there are the plurality of transmission links having cached downlink data, the plurality of identification information can be used to indicate the plurality of transmission links, and one TIM can be set before each identification information.

In an embodiment, the beacon frame further includes: contention period indication information, in which the contention period indication information is configured to indicate a time domain position of a contention period of each of the plurality of transmission links.

The contention period indication information may be used in the beacon frame to indicate the time domain position of the contention period of each of the plurality of transmission links.

After receiving the beacon frame, the second communication device may determine the time domain position of the contention period of each transmission link according to an indication of the contention period indication information.

When the downlink link indication information in the beacon frame indicates the transmission link having cached downlink data, the second communication device may access in a contention manner based on the time domain position of the contention period of the transmission link having cached downlink data in the beacon frame to receive the cache downlink data. It is no longer necessary to listen to the beacon frame indicating the time domain position of the contention period on the transmission link having the cached downlink data.

In this way, one transmission link in the plurality of transmission links is used to transmit and indicate the time domain position of the contention period of each transmission link. On one hand, the wireless AP does not need to broadcast the beacon frame indicating the time domain position of the contention period on each transmission link, which saves transmission resources and further saves the energy consumption of the wireless AP. On the other hand, the wireless STA does not need to monitor the beacon frame indicating the time domain position of the contention period on each transmission link, which saves reception resources and further saves the energy consumption of the wireless STA. On the further other hand, the wireless AP can indicate both the transmission link having cached downlink data and the time domain position of the contention period of the transmission link in the same beacon frame, which improves the indication efficiency and improves the communication efficiency.

In an embodiment, the contention period indication information includes: identification information of one or more unselected transmission links in the plurality of transmission links, and first time interval information between a contention period of each of the one or more unselected transmission links and the beacon frame.

The beacon frame usually carries the time domain information indicating the contention period of the transmission link of receiving the beacon frame, that is, it carries the time domain information of the contention period of the selected transmission link.

For the unselected transmission link, the first time interval information and the identification information of the transmission link may be combined to indicate the time interval of the contention period of the unselected transmission link relative to the beacon frame. Herein, the time interval can be expressed in the form of a time offset.

In some examples, a time offset combined with a transmission link identifier can be used to indicate the time offset of the contention period of the transmission link relative to the beacon frame. For example, 4 bits may be used to indicate the time offset, and the other 4 bits may be used to indicate the transmission link identifier.

In an embodiment, the contention period indication information includes: second time interval information between a contention period of the selected transmission link and the beacon frame.

For the selected transmission link, the second time interval information may be used to indicate the time interval of the contention period of the selected transmission link relative to the beacon frame. Herein, the time interval can be expressed in the form of a time offset.

In some examples, the time offset may be used to indicate the time offset of the contention period of the selected transmission link relative to the beacon frame. For example, 4 bits can be used to indicate the time offset.

In an embodiment, the selected transmission link includes: an initial transmission link used when establishing an association relationship with the second communication device.

The selected transmission link may be the transmission link used when the first communication device and the second communication device establish an association relationship for the first time. The first communication device uses the transmission link used when establishing the association relationship with the second communication device for the first time, to transmit the beacon frame carrying downlink link indication information and/or contention period indication information, and the beacon frame is received by the second communication device.

Establishing the association relationship refers to a process in which the second communication device accesses the second communication device and obtains the access right. The second communication device may request to establish the association relationship by transmitting an association request frame, and the first communication device may determine to establish the association relationship by returning an association response frame.

In an embodiment, the method further includes: transmitting link selection information, in which the link selection information is configured to indicate the selected transmission link.

After the first communication device selects the transmission link used to transmit the beacon frame carrying downlink link indication information and/or contention period indication information, it may indicate the transmission link by transmitting an instruction or the like.

The first communication device may indicate the transmission link by setting the identification number of the selected transmission link in the predetermined bit position of the instruction; it may also transmit an instruction with a predetermined identifier on the selected transmission link to indicate the transmission link that received the instruction is the transmission link used for transmitting the beacon frame carrying downlink link indication information and/or contention period indication information.

In an embodiment, transmitting the link selection information includes: transmitting an association response frame, in which a predetermined information element of the association response frame or a preset bit of an MAC frame header of the association response frame carries the link selection information.

The first communication device may indicate the selected transmission link through the association response frame.

An information element (IE) can be set in the association response frame to carry transmission link selection information to indicate the selected transmission link, or one or more bits in the MAC frame header of the association response frame can be used to carry the transmission link selection information.

For example, when establishing the initial association relationship, a bit in the MAC frame header of the association response frame may be used to indicate the selected transmission link. For example, "1" is used to indicate that the current transmission link is the selected transmission link for transmitting the beacon frame carrying downlink link indication information and/or contention period indication information.

The second communication device may determine the selected transmission link according to the link selection information in the association response frame, and receive, on the transmission link, the transmission link for transmitting the beacon frame carrying downlink link indication information and/or contention period indication information.

Figure 4:
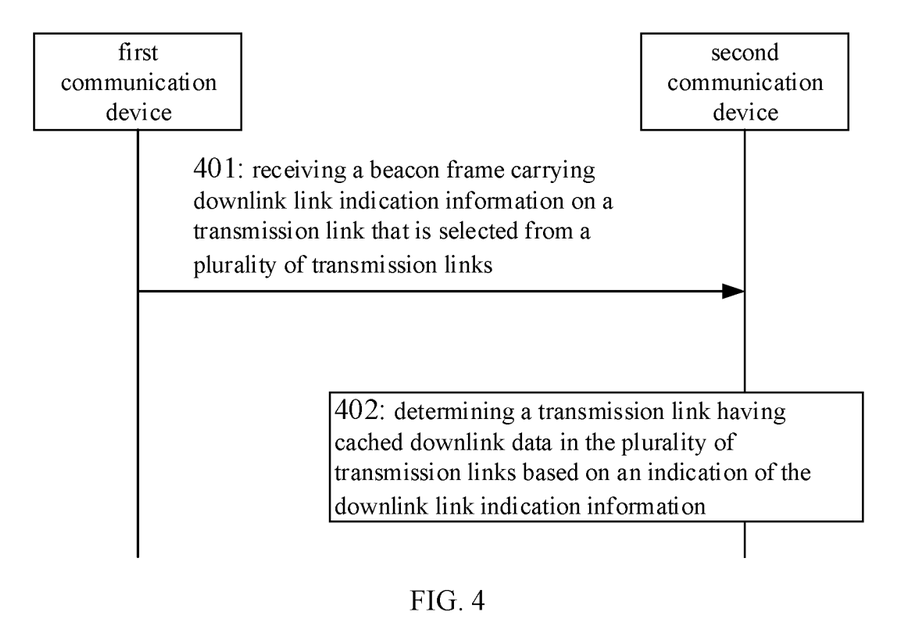
FIG. 4 is a flowchart of another method for transmitting data according to some embodiments.

As illustrated in FIG. 4, some embodiments provide a method for transmitting data. The method is applied to a second communication device of wireless communication. The method includes the following.

Step 401: a beacon frame carrying downlink link indication information is received on a transmission link that is selected from a plurality of transmission links.

Step 402: a transmission link having cached downlink data in the plurality of transmission links is determined based on an indication of the downlink link indication information.

The wireless communication may be the Wi-Fi communication such as IEEE802.11be standard. The first communication device may be a wireless AP in the Wi-Fi communication technology and the second communication device may be a wireless STA in the Wi-Fi communication technology. The first communication device and the second communication device may communicate through the plurality of transmission links.

In the plurality of transmission links, each transmission link can occupy one transmission frequency band and the plurality of transmission links can occupy the plurality of transmission frequency bands. The transmission frequency bands can be a plurality of Wi-Fi working frequency bands, such as 2.4 GHz, 5.8 GHz and 6-7 GHz. Under the same frequency band, the bandwidths occupied by the transmission frequency bands of the plurality of transmission links can be the same or different. For example, the bandwidths occupied by the plurality of transmission links may be one or more of 20 MHz, 40 MHz, and 80 MHz. The frequency range of the bandwidth occupied by each transmission frequency band can belong to the same Wi-Fi working frequency band or different Wi-Fi working frequency bands.

When the first communication device determines that one or more communication links have cached downlink data that needs to be transmitted to the second communication device, it can select one transmission link from the plurality of transmission links established with the second communication device, and transmit the beacon frame carrying the downlink link indication information through this transmission link. The downlink link indication information may simultaneously indicate one or more communication links that have cached downlink data. The downlink link indication information may indicate the transmission link having cached downlink data by carrying an identifier of the transmission link or the like.

After receiving the beacon frame carrying the downlink link indication information from the communication link selected by the first communication device, the second communication device determines the transmission link that has cached downlink data based on an indication of the downlink link indication information, and receives the downlink data cached by the first communication device on each transmission link that has cached downlink data.

The transmission link used to transmit the beacon frame carrying the downlink link indication information may be negotiated in advance by the first communication device and the second communication device, or specified by a communication protocol, or selected by the first communication device according to a predetermined selection rule. If the transmission link used to transmit the beacon frame carrying the downlink link indication information is selected by the first communication device, the first communication device may instruct the selected transmission link to the second communication device through an instruction or the like.

In some examples, after the first communication device establishes the plurality of communication links with the second communication device, one transmission link may be randomly selected to transmit the beacon frame carrying the downlink link indication information, and the second communication device may be instructed with the selected transmission link through the indication information.

In this way, one transmission link in the plurality of transmission links is used for transmitting the beacon frame indicating the transmission link having cached downlink data, and the downlink link indication information is concentrated into one transmission link for transmitting, which improves the efficiency of information indication; and it is not necessary for a wireless AP to respectively transmit indications of transmission links having cached downlink data on transmission links having cached downlink data, which saves transmission resources and further saves the energy consumption of the wireless AP. On the other hand, it is not necessary for a wireless STA to monitor the beacon frame indicating the transmission link having cached downlink data on each transmission link, which saves reception resources and further saves the energy consumption of the wireless STA.

In an embodiment, determining the transmission link having the cached downlink data in the plurality of transmission links based on the indication of the downlink link indication information includes: determining the transmission link having the cached downlink data, of the second communication device, based on TIM information and/or identification information in the beacon frame.

The TIM can indicate the communication device having cached downlink data in the form of a bitmap or the like, and the identification information can indicate the transmission link having cached downlink data in the communication device indicated by the TIM.

When a wireless STA accesses a wireless AP, the wireless AP can assign an association identity (AID) to the wireless STA, and allocate one or more bits for each AID in the TIM to indicate the AID whether cached downlink data exits.

In some examples, a bit in the TIM may be used to indicate the wireless STA whether cached downlink data exits. For example, "1" may be used to indicate the wireless STA that cached downlink data exits, and "0" may be used to indicate the wireless STA that cached downlink data does not exit; or "1" may be used to indicate the wireless STA that cached downlink data does not exit, and "0" may be used to indicate the wireless STA that cached downlink data exits.

After the second communication device detects the beacon frame on the selected transmission link, it can parse the TIM in the beacon frame to determine whether cached downlink data exits, and if so, it continues to determine the transmission link having cached downlink data according to the identification information. The identification information may include the identification number of one or more transmission links.

In practical applications, a manner of setting one identification information after one TIM may be adopted. Herein, one identification information may include the identification number of at least one transmission link. It is also possible to carry the identification number of one transmission link in the identification information. When there are the plurality of transmission links having cached downlink data, the plurality of identification information can be used to indicate the plurality of transmission links, and one TIM can be set before each identification information.

In an embodiment, the method further includes: determining a time domain position of a contention period of each of the plurality of transmission links based on contention period indication information in the beacon frame.

The contention period indication information may be used in the beacon frame to indicate the time domain position of the contention period of each of the plurality of transmission links.

After receiving the beacon frame, the second communication device may determine the time domain position of the contention period of each transmission link according to an indication of the contention period indication information.

When the downlink link indication information in the beacon frame indicates the transmission link having cached downlink data, the second communication device may access in a contention manner based on the time domain position of the contention period of the transmission link having cached downlink data in the beacon frame to receive the cache downlink data. It is no longer necessary to listen to the beacon frame indicating the time domain position of the contention period on the transmission link having the cached downlink data.

In this way, one transmission link in the plurality of transmission links is used to transmit and indicate the time domain position of the contention period of each transmission link. On one hand, the wireless AP does not need to broadcast the beacon frame indicating the time domain position of the contention period on each transmission link, which saves transmission resources and further saves the energy consumption of the wireless AP. On the other hand, the wireless STA does not need to monitor the beacon frame indicating the time domain position of the contention period on each transmission link, which saves reception resources and further saves the energy consumption of the wireless STA. On the further other hand, the wireless AP can indicate both the transmission link having cached downlink data and the time domain position of the contention period of the transmission link in the same beacon frame, which improves the indication efficiency and improves the communication efficiency.

In an embodiment, determining the time domain position of the contention period of each of the plurality of transmission links based on the contention period indication information in the beacon frame includes: determining a time interval between a contention period of each of one or more unselected transmission links in the plurality of transmission links and the beacon frame based on identification information and first time interval information in the beacon frame.

The beacon frame usually carries the time domain information indicating the contention period of the transmission link of receiving the beacon frame, that is, it carries the time domain information of the contention period of the selected transmission link.

For the unselected transmission link, the first time interval information and the identification information of the transmission link may be combined to indicate the time interval of the contention period of the unselected transmission link relative to the beacon frame. Herein, the time interval can be expressed in the form of a time offset.

In some examples, a time offset combined with a transmission link identifier can be used to indicate the time offset of the contention period of the transmission link relative to the beacon frame. For example, 4 bits may be used to indicate the time offset, and the other 4 bits may be used to indicate the transmission link identifier.

In an embodiment, determining the time domain position of the contention period of each of the plurality of transmission links based on the contention period indication information in the beacon frame includes: determining a time interval between a contention period of the selected transmission link and the beacon frame based on second time interval information in the beacon frame.

For the selected transmission link, the second time interval information may be used to indicate the time interval of the contention period of the selected transmission link relative to the beacon frame. Herein, the time interval can be expressed in the form of a time offset.

In some examples, the time offset may be used to indicate the time offset of the contention period of the selected transmission link relative to the beacon frame. For example, 4 bits can be used to indicate the time offset.

In an embodiment, receiving the beacon frame carrying the downlink link indication information on the transmission link that is selected from the plurality of transmission links includes: receiving the beacon frame on a transmission link used when establishing an association relationship with a first communication device.

The selected transmission link may be the transmission link used when the first communication device and the second communication device establish an association relationship for the first time. The first communication device uses the transmission link used when establishing the association relationship with the second communication device for the first time, to transmit the beacon frame carrying downlink link indication information and/or contention period indication information, and the beacon frame is received by the second communication device.

Establishing the association relationship refers to a process in which the second communication device accesses the second communication device and obtains the access right. The second communication device may request to establish the association relationship by transmitting an association request frame, and the first communication device may determine to establish the association relationship by returning an association response frame.

In an embodiment, the method further includes: receiving link selection information; and receiving the beacon frame carrying the downlink link indication information on the transmission link that is selected from the plurality of transmission links includes: receiving the beacon frame on a transmission link indicated by the link selection information.

After the first communication device selects the transmission link used to transmit the beacon frame carrying downlink link indication information and/or contention period indication information, it may indicate the transmission link by transmitting an instruction or the like.

The first communication device may indicate the transmission link by setting the identification number of the selected transmission link in the predetermined bit position of the instruction; it may also transmit an instruction with a predetermined identifier on the selected transmission link to indicate the transmission link that received the instruction is the transmission link used for transmitting the beacon frame carrying downlink link indication information and/or contention period indication information.

The second communication device determines the selected transmission link on the basis of the link selection information and receives on that transmission link the transmission link for transmitting the beacon frames carrying downlink link indication information and/or contention period indication information.

In an embodiment, receiving the link selection information includes: receiving an association response frame, in which a predetermined information element of the association response frame or a preset bit of an MAC frame header of the association response frame carries the link selection information.

The first communication device may indicate the selected transmission link through the association response frame.

An information element (IE) can be set in the association response frame to carry transmission link selection information to indicate the selected transmission link, or one or more bits in the MAC frame header of the association response frame can be used to carry the transmission link selection information.

For example, when establishing the initial association relationship, a bit in the MAC frame header of the association response frame may be used to indicate the selected transmission link. For example, "1" is used to indicate that the current transmission link is the selected transmission link for transmitting the beacon frame carrying downlink link indication information and/or contention period indication information.

The second communication device may determine the selected transmission link according to the link selection information in the association response frame, and receive, on the transmission link, the transmission link for transmitting the beacon frame carrying downlink link indication information and/or contention period indication information.

In an embodiment, the method further includes: controlling a transmission link having no cached downlink data to enter a first connection state, in which a power consumption of the first connection state is less than a power consumption of a second connection state.

The first connection state may be the dormant state of the transmission link, and the second connection state may be the normal working state of the transmission link. The power consumption of the transmission link in the normal working state is greater than the power consumption of the transmission link in the dormant state.

For a transmission link that does not have cached downlink data, the second communication device may control the transmission link to enter the dormant mode. In this way, the power consumption of the transmission link can be reduced, thereby saving the power of the second communication device.

A specific example is provided below in conjunction with any of the foregoing embodiments.

1, The wireless AP can indicate the transmission link to listen to the TIM information to the STA that supports multiple transmission links.

The AP may determine that the transmission link of receiving the beacon frame carrying the TIM information for the STA is the transmission link for the STA to establish the initial association with the AP. The AP may determine the transmission link during the process of establishing the initial association between the STA and the AP. Specifically, it can be determined in the form of an information element of an association response frame, or it can be determined using a bit in the MAC header of the association response frame.

2, The AP broadcasts the time domain information of the contention period of each link in the beacon frame.

The AP broadcasts the beacon frame in the link that establishes the initial association with the STA in the multiple transport links. If cached downlink data frame exists on the multiple transport links for the STA that supports multiple transmission links, the AP sets the TIM information position corresponding to the STA to "1". It is in the form of AID+ transmission link.

To save the power for the AP and the STA, it is not necessary to parse the CP time domain information in the beacon frame broadcast by the AP under each link, and the CP domain information of other links can be carried in the beacon frame transmitted by the initial association link, in which the specific format is time offset+transmission link, which can appear in the form of an information element. The time offset may be the time offset between the contention period of the transmission link and the beacon frame. The time offset of each transmission link can be different, and there is a time difference.

3, The STA that supports multiple transmission links does not need to receive beacon frames under other links. If there is no uncashed downlink data on the transmission link, the STA can go to sleep under this link.

Figure 5:
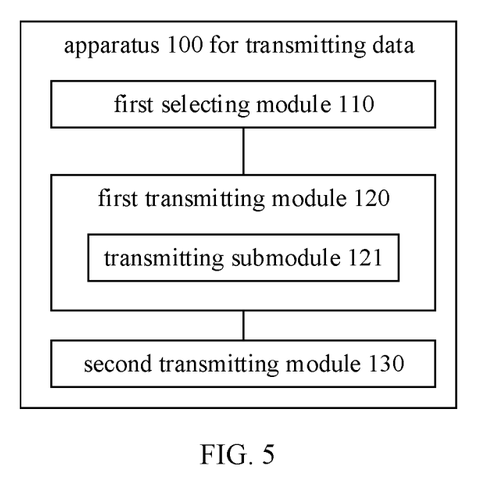
FIG. 5 is a block diagram of an apparatus for transmitting data according to some embodiments.

Embodiments of the disclosure also provide an apparatus for transmitting data. The apparatus is applied to a first communication device of wireless communication. FIG. 5 is a block diagram of an apparatus 100 for transmitting data according to some embodiments. As illustrated in FIG. 5, the apparatus 100 includes a first selecting module 110 and a first transmitting module 120.

The first selecting module 110 is configured to select one transmission link from a plurality of transmission links to transmit a beacon frame carrying downlink link indication information, in which the downlink link indication information is configured to indicate a transmission link having cached downlink data in the plurality of transmission links.

The first transmitting module 120 is configured transmit the beacon frame through the selected transmission link.

In an embodiment, the downlink link indication information includes: TIM information and/or identification information, in which the TIM information is configured to indicate a second communication device to which the transmission link having the cached downlink data belongs, and the identification information is configured to indicate the transmission link having the cached downlink data.

In an embodiment, the beacon frame further includes: contention period indication information, in which the contention period indication information is configured to indicate a time domain position of a contention period of each of the plurality of transmission links.

In an embodiment, the contention period indication information includes: identification information of one or more unselected transmission links in the plurality of transmission links, and first time interval information between a contention period of each of the one or more unselected transmission links and the beacon frame.

In an embodiment, the contention period indication information includes: second time interval information between a contention period of the selected transmission link and the beacon frame.

In an embodiment, the selected transmission link includes: an initial transmission link used when establishing an association relationship with the second communication device.

In an embodiment, the apparatus 120 further includes: a second transmitting module 130, configured to transmit link selection information, in which the link selection information is configured to indicate the selected transmission link.

In an embodiment, the first transmitting module 120 includes: a transmitting submodule 121, configured to transmit an association response frame, in which a predetermined information element of the association response frame or a preset bit of an MAC frame header of the association response frame carries the link selection information.

Figure 6:
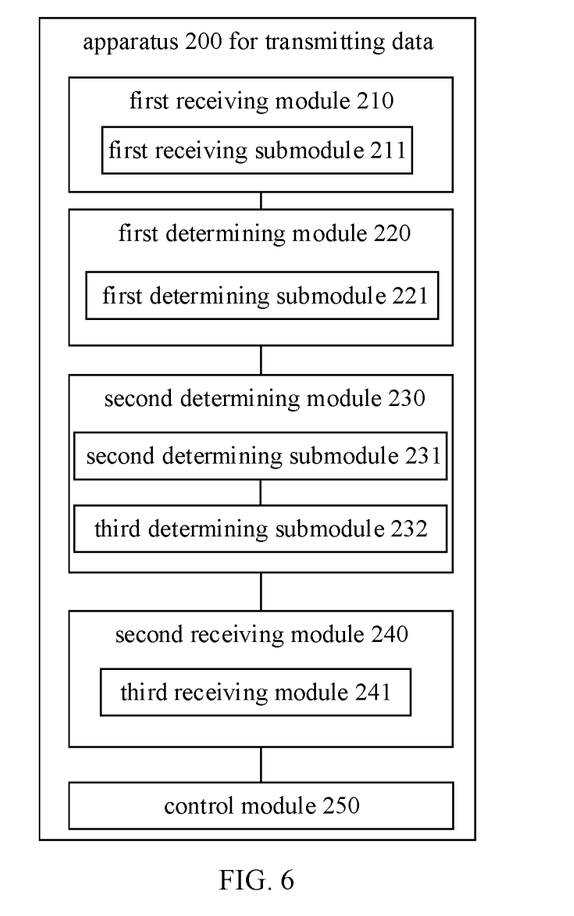
FIG. 6 is a block diagram of another apparatus for transmitting data according to some embodiments.

Embodiments of the disclosure also provide an apparatus for transmitting data. The apparatus is applied to a first communication device of wireless communication. FIG. 6 is a block diagram of an apparatus 200 for transmitting data according to some embodiments. As illustrated in FIG. 6, the apparatus 200 includes a first receiving module 210 and a first determining module 220.

The first receiving module 210 is configured to receive a beacon frame carrying downlink link indication information on a transmission link that is selected from a plurality of transmission links.

The first determining module 220 is configured to determine a transmission link having cached downlink data in the plurality of transmission links based on an indication of the downlink link indication information.

In an embodiment, the first determining module 220 includes: a first determining submodule 221, configured to determine the transmission link having the cached downlink data, of the second communication device, based on TIM information and/or identification information in the beacon frame.

In an embodiment, the apparatus 200 further includes: a second determining module 230, configured to determine a time domain position of a contention period of each of the plurality of transmission links based on contention period indication information in the beacon frame.

In an embodiment, the second determining module 230 includes: a second determining submodule 231, configured to determine a time interval between a contention period of each of one or more unselected transmission links in the plurality of transmission links and the beacon frame based on identification information and first time interval information in the beacon frame.

In an embodiment, the second determining module 230 includes: a third determining submodule 232, configured to determine a time interval between a contention period of the selected transmission link and the beacon frame based on second time interval information in the beacon frame.

In an embodiment, the first receiving module 210 includes: a first receiving submodule 211, configured to receive the beacon frame on a transmission link used when establishing an association relationship with a first communication device.

In an embodiment, the apparatus 200 further includes: a second receiving module 240, configured to receive link selection information; and the first receiving module 210 includes: a second receiving submodule 212, configured to receive the beacon frame on a transmission link indicated by the link selection information.

In an embodiment, the second receiving module 240 includes: a third receiving submodule 241, configured to receive an association response frame, in which a predetermined information element of the association response frame or a preset bit of an MAC frame header of the association response frame carries the link selection information.

In an embodiment, the apparatus 200 further includes: a control module 250, configured to control a transmission link having no cached downlink data to enter a first connection state, in which a power consumption of the first connection state is less than a power consumption of a second connection state.

In some embodiments, the first selecting module 110, the first transmitting module 120, the second transmitting module 130, the first receiving module 210, the first determining module 220, the second determining module 230, the control module 250, the second receiving module 240 and the like can be configured by one or more central processing units (CPU), graphics processing unit (GPU), baseband processor (BP), application specific integrated circuit (ASIC), DSP, programmable logic device (PLD), complex programmable logic device (CPLD), field-programmable gate array (FPGA), general-purpose processor, a controller, a micro controller unit (MCU), a microprocessor ( ) or other electronic components to implement the foregoing methods.

Figure 7:
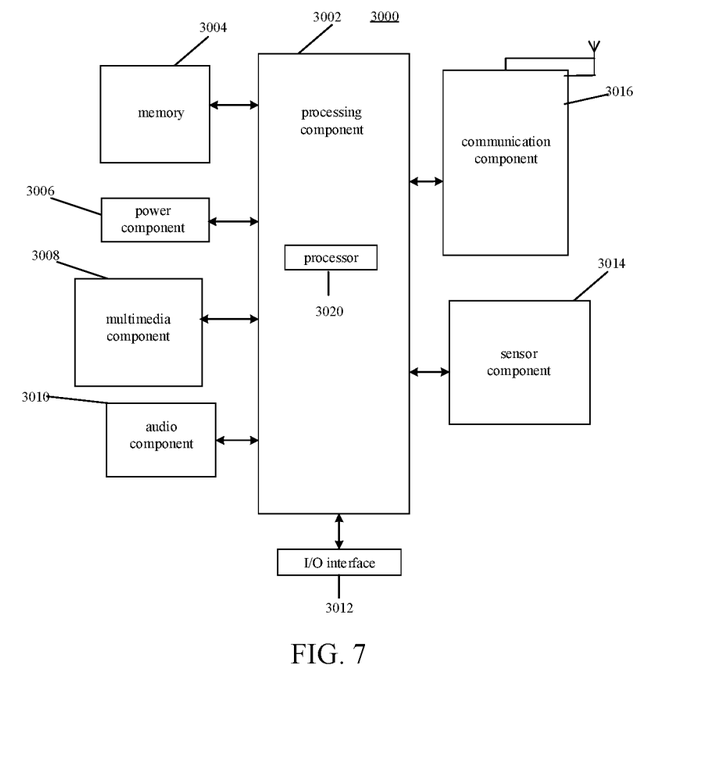
FIG. 7 is a block diagram of a device for transmitting data according to some embodiments.

FIG. 7 is a block diagram of a device 3000 for transmitting data or determining transfer block configuration parameters according to some embodiments. For example, the device 3000 may be a mobile phone, a computer, a digital broadcast terminal, a messaging device, a gaming console, a tablet, a medical device, exercise equipment, a personal digital assistant, and the like.

Referring to FIG. 7, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 3020 to execute instructions to perform all or part of the steps in the above described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the device 3000. Examples of such data include instructions for any applications or methods operated on the device 3000, contact data, phonebook data, messages, pictures, video, etc. The memory 3004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front camera and/or a rear camera. The front camera and the rear camera may receive an external multimedia datum while the device 3000 is in an operation mode, such as a photographing mode or a video mode. Each of the front camera and the rear camera may be a fixed optical lens system or have focus and optical zoom capability.

The audio component 3010 is configured to output and/or input audio signals. For example, the audio component 3010 includes a microphone ("MIC") configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 30114 may include a proximity sensor configured to detect the presence of nearby objects without any physical contact. The sensor component 30114 may also include a light sensor, such as a CMOS or CCD image sensor, for use in imaging applications. In some embodiments, the sensor component 30114 may also include an accelerometer sensor, a gyroscope sensor, a magnetic sensor, a pressure sensor, or a temperature sensor.

The communication component 30116 is configured to facilitate communication, wired or wirelessly, between the device 3000 and other devices. The device 3000 can access a wireless network based on a communication standard, such as Wi-Fi, 2G, or 3G, or a combination thereof. In one exemplary embodiment, the communication component 30116 receives a broadcast signal or broadcast associated information from an external broadcast management system via a broadcast channel. In one exemplary embodiment, the communication component 30116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 3004, executable by the processor 820 in the device 3000, for performing the above-described methods. For example, the non-transitory computer-readable storage medium may be a ROM, a RAM, a CD-ROM, a magnetic tape, a floppy disc, an optical data storage device, and the like. In the method and the apparatus for transmitting data, the communication device, and the storage medium provided in embodiments of the disclosure, one transmission link is selected from the plurality of transmission links to transmit the beacon frame carrying the downlink link indication information, in which the downlink link indication information is configured to indicate the transmission link having cached downlink data in the plurality of transmission links; and the beacon frame is transmitted through the selected transmission link. In this way, one transmission link in the plurality of transmission links is used for transmitting the beacon frame indicating the transmission link having cached downlink data, and the downlink link indication information is concentrated into one transmission link for transmitting, which improves the efficiency of information indication; and it is not necessary for a wireless AP to respectively transmit indications of transmission links having cached downlink data on transmission links having cached downlink data, which saves transmission resources and further saves the energy consumption of the wireless AP.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for transmitting data, comprising:
   selecting, by a first communication device, one transmission link from a plurality of transmission links to transmit a beacon frame carrying downlink link indication information, wherein the downlink link indication information is configured to indicate a transmission link comprising buffered downlink data in the plurality of transmission links, and the plurality of transmission links are established between the first communication device and a second communication device; and
   transmitting, by the first communication device, the beacon frame through the transmission link that is selected;
   wherein the downlink link indication information comprises one of: traffic indication map (TIM) information or identification information, the TIM information is configured to indicate the second communication device to which the transmission link having the buffered downlink data belongs, the identification information is configured to indicate the transmission link comprising the buffered downlink data, and the identification information comprises one or more identification numbers of one or more transmission links.

2. The method as claimed in claim 1, wherein the beacon frame further comprises: contention period indication information, wherein the contention period indication information is configured to indicate a time domain position of a contention period of each of the plurality of transmission links.

3. The method as claimed in claim 2, wherein the contention period indication information comprises: identification information of one or more unselected transmission links in the plurality of transmission links, and first time interval information between a contention period of each of the one or more unselected transmission links and the beacon frame.

4. The method as claimed in claim 2, wherein the contention period indication information comprises: second time interval information between a contention period of the transmission link that is selected and the beacon frame.

5. The method as claimed in claim 1, wherein the transmission link that is selected comprises:
   an initial transmission link used in response to establishing an association relationship with the second communication device.

6. The method as claimed in claim 1, further comprising:
   transmitting, by the first communication device, link selection information, wherein the link selection information is configured to indicate the transmission link that is selected.

7. The method as claimed in claim 6, wherein transmitting the link selection information comprises:
   transmitting an association response frame, wherein a predetermined information element of the association response frame or a preset bit of a media access control (MAC) frame header of the association response frame carries the link selection information.

8. A method for transmitting data, comprising:
   receiving, by a second communication device, a beacon frame carrying downlink link indication information on a transmission link that is selected from a plurality of transmission links, wherein the plurality of transmission links are established between a first communication device and the second communication device; and
   determining, by the second communication device, a transmission link comprising buffered downlink data in the plurality of transmission links based on an indication of the downlink link indication information;
   wherein the downlink link indication information comprises one of: traffic indication map (TIM) information or identification information, the TIM information is configured to indicate the second communication device to which the transmission link having the buffered downlink data belongs, the identification information is configured to indicate the transmission link comprising the buffered downlink data, and the identification information comprises one or more identification numbers of one or more transmission links.

9. The method as claimed in claim 8, further comprising:
   determining, by the second communication device, a time domain position of a contention period of each of the plurality of transmission links based on contention period indication information in the beacon frame.

10. The method as claimed in claim 9, wherein determining the time domain position of the contention period of each of the plurality of transmission links based on the contention period indication information in the beacon frame comprises:
    determining a time interval between a contention period of each of one or more unselected transmission links in the plurality of transmission links and the beacon frame based on identification information and first time interval information in the beacon frame.

11. The method as claimed in claim 9, wherein determining the time domain position of the contention period of each of the plurality of transmission links based on the contention period indication information in the beacon frame comprises:
    determining a time interval between a contention period of the selected transmission link and the beacon frame based on second time interval information in the beacon frame.

12. The method as claimed in claim 8, wherein receiving the beacon frame carrying the downlink link indication information on the transmission link that is selected from the plurality of transmission links comprises:

receiving the beacon frame on a transmission link used in response to establishing an association relationship with the first communication device.

13. The method as claimed in claim 8, further comprising:
receiving, by the second communication device, link selection information;
wherein receiving the beacon frame carrying the downlink link indication information on the transmission link that is selected from the plurality of transmission links comprises:
receiving the beacon frame on a transmission link indicated by the link selection information.

14. The method as claimed in claim 13, wherein receiving the link selection information comprises:
receiving an association response frame, wherein a predetermined information element of the association response frame or a preset bit of a media access control (MAC) frame header of the association response frame carries the link selection information.

15. The method as claimed in claim 8, further comprising:
controlling, by the second communication device, a transmission link comprising no buffered downlink data to enter a first connection state, wherein a power consumption of the first connection state is less than a power consumption of a second connection state.

16. A communication device, comprising a processor, a transceiver, a memory, and an executable program stored on the memory and capable of being executed by the processor, wherein the processor is configured to, when executing the executable program:
select one transmission link from a plurality of transmission links to transmit a beacon frame carrying downlink link indication information, wherein the downlink link indication information is configured to indicate a transmission link comprising buffered downlink data in the plurality of transmission links, and the plurality of transmission links are established between a first communication device and a second communication device; and
transmit the beacon frame through the transmission link that is selected;
wherein the downlink link indication information comprises one of: traffic indication map (TIM) information or identification information; the TIM information is configured to indicate the second communication device to which the transmission link having the buffered downlink data belongs, the identification information is configured to indicate the transmission link comprising the buffered downlink data, and the identification information comprises one or more identification numbers of one or more transmission links.

17. A non-transitory computer-readable storage medium on which an executable program is stored, wherein when the executable program is executed by a processor, the processor is configure to perform the method for transmitting data as claimed in claim 1.

18. A communication device, comprising a processor, a transceiver, a memory, and an executable program stored on the memory and capable of being executed by the processor, wherein the processor is configured to perform the method for transmitting data as claimed in claim 8 when executing the executable program.

* * * * *